(12) United States Patent
Hegler et al.

(10) Patent No.: US 11,407,164 B2
(45) Date of Patent: Aug. 9, 2022

(54) REROUNDER SYSTEM

(71) Applicant: Trinity Bay Equipment Holdings, LLC, Houston, TX (US)

(72) Inventors: Matthew Allen Hegler, Kingwood, TX (US); Beau A. Schexnaydre, Baytown, TX (US); Alexander Lee Winn, Spring, TX (US); Alexander Ryan Barnett, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 22 days.

(21) Appl. No.: 16/572,582

(22) Filed: Sep. 16, 2019

(65) Prior Publication Data

US 2021/0078237 A1 Mar. 18, 2021

(51) Int. Cl.
| | | |
|---|---|---|
| *B29C 53/08* | (2006.01) | |
| *B65H 75/42* | (2006.01) | |
| *B21D 3/05* | (2006.01) | |
| *B29L 23/00* | (2006.01) | |
| *B29K 23/00* | (2006.01) | |

(52) U.S. Cl.
CPC ............. *B29C 53/086* (2013.01); *B21D 3/05* (2013.01); *B65H 75/425* (2013.01); *B29K 2023/065* (2013.01); *B29L 2023/22* (2013.01)

(58) Field of Classification Search
CPC .................................. B29C 53/20; B29D 3/02
See application file for complete search history.

(56) References Cited

U.S. PATENT DOCUMENTS

| | | | | |
|---|---|---|---|---|
| 2,453,038 A | * | 11/1948 | Rossmann | E21B 17/20 166/75.11 |
| 5,676,009 A | * | 10/1997 | Bright | B21D 3/05 72/161 |
| 6,419,424 B1 | * | 7/2002 | Null | B65H 49/24 242/557 |
| 10,293,562 B2 | * | 5/2019 | Jha | G01N 29/043 |
| 10,774,950 B2 | * | 9/2020 | Finch | F16L 3/105 |
| 2008/0181727 A1 | | 7/2008 | Crane | |
| 2017/0328494 A1 | * | 11/2017 | Finch | F16L 1/235 |
| 2017/0334156 A1 | * | 11/2017 | Jha | G01N 29/043 |
| 2019/0257445 A1 | | 8/2019 | Case et al. | |

FOREIGN PATENT DOCUMENTS

EP          3199481 A1    2/2017

OTHER PUBLICATIONS

MacMillan, Definition of Slanted, Jun. 13, 2017, http://web.archive.org/web/20170613054202/https://www.macmillandictionary.com/us/dictionary/american/slanted (Year: 2017).*
The Free Dictionary, Definition of Slanted, Nov. 14, 2020, http://web.archive.org/web/20201114002003/https://www.thefreedictionary.com/slanted (Year: 2020).*
International Search Report and Written Opinion for PCT/US2020/051110 dated Mar. 9, 2021.

* cited by examiner

*Primary Examiner* — Niki Bakhtiari
*Assistant Examiner* — Nicholas J Chidiac
(74) *Attorney, Agent, or Firm* — Fletcher Yoder, P.C.; Matthew G. Osterhaus

(57) ABSTRACT

A pipe deployment system that includes a vehicle or trailer. A coil of pipe couples to the vehicle or trailer. A rerounder system is supported by and couples to the vehicle or trailer. The rerounder system changes a cross-sectional shape of the pipe. The rerounder system rotates relative to the vehicle or trailer to facilitate loading of the coil, and un-loading of the product on the coil.

9 Claims, 8 Drawing Sheets

REROUNDER SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Flexible pipe is useful in various environments, including in the oil and gas industry. Flexible pipe may be durable and operational in harsh operating conditions and can accommodate high pressures and temperatures. Flexible pipe may be bundled and arranged into one or more coils to facilitate transport and use of the pipe.

The flexible pipe may be transported as coils to various sites for deployment (also referred to as uncoiling or unspooling). Unfortunately, the winding of the flexible pipe into a coil may change the cross-sectional shape of the flexible pipe. For example, during the winding process the cross-sectional shape of the flexible pipe may change from a substantially circular cross-sectional shape to a more oval shape. A flexible pipe with an oval cross-sectional shape can lead to kinking of the flexible pipe during deployment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a pipe deployment system includes a vehicle or trailer. A coil of pipe couples to the vehicle or trailer. A rerounder system is supported by and couples to the vehicle or trailer. The rerounder system changes a cross-sectional shape of the pipe. The rerounder system rotates relative to the vehicle or trailer to facilitate loading of the coil.

In another example, a rerounder system includes a housing. The housing couples to and slides along a bar in response to uncoiling of a pipe. A first clamp arm assembly couples to the housing. A second clamp arm assembly also couples to the housing. The first clamp arm assembly moves relative to the second clamp arm assembly to secure the pipe in a gap between the first clamp arm assembly and the second clamp arm assembly. A first set of rollers changes a cross-sectional shape of the pipe.

In another example, a rerounder system includes a housing. The housing couples to and slides along a bar in response to uncoiling of a pipe. A number of die plates couple together to define an aperture that receives the pipe. The die plates change a cross-sectional shape of the pipe as the pipe moves through the aperture of the rerounder system.

Other aspects and advantages of the claimed subject matter will be apparent from the following description and the appended claims.

DETAILED DESCRIPTION

Figure 1:
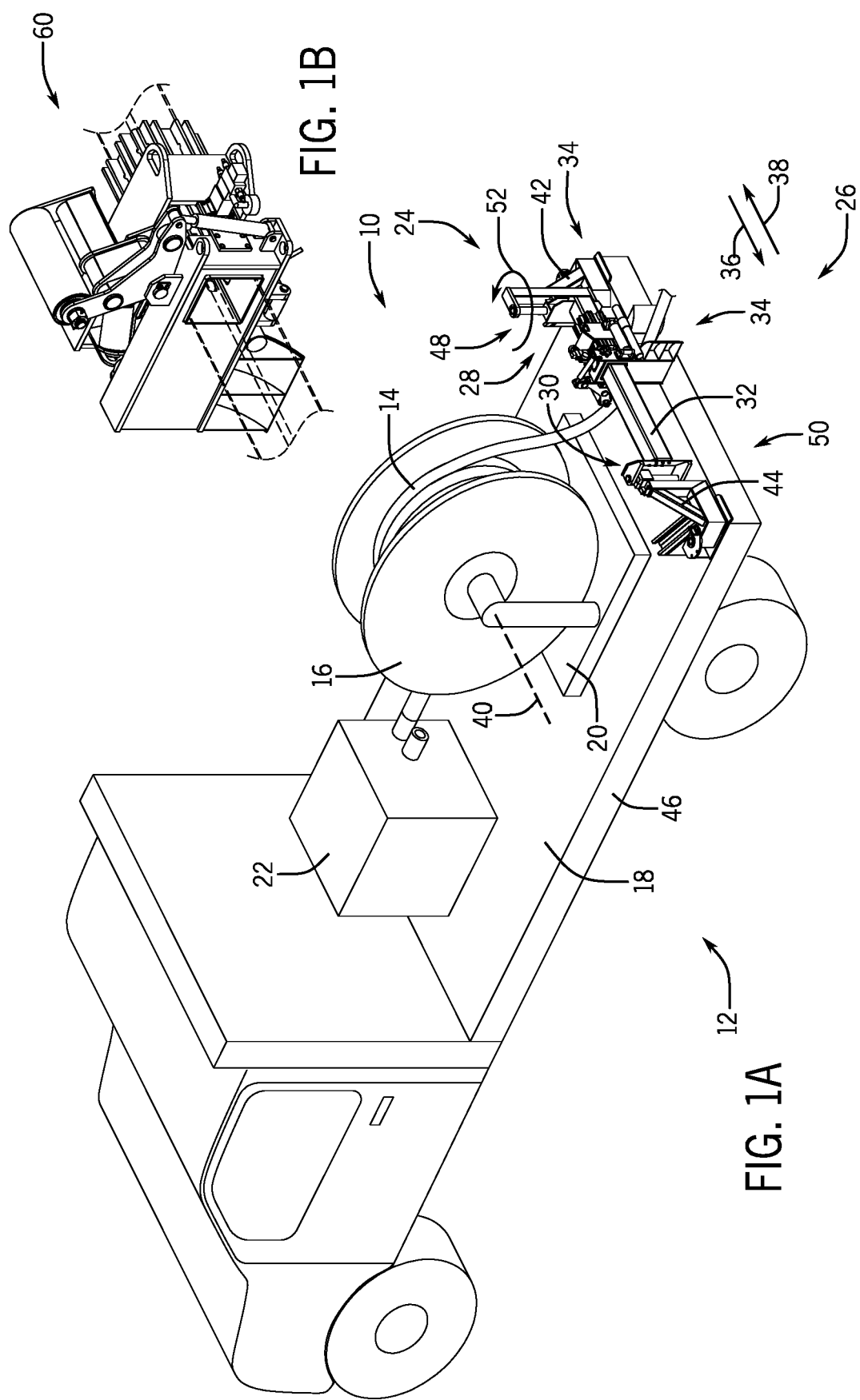
FIG. 1A is a perspective view of a pipe deployment system, according to embodiments of the present disclosure.
FIG. 1B is a perspective view of a pipe deployment system, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Embodiments of the present disclosure relate generally to systems used for rerounding flexible pipe while deploying the flexible pipe from an installation vehicle or trailer. As explained above, flexible pipe may be transported as coils to various job sites. For example, the coil may be wound onto and transported on a spool, reel, or drum. Unfortunately, the winding of the flexible pipe into a coil may change the cross-sectional shape of the flexible pipe. That is, the winding of the flexible pipe may change the cross-sectional shape of the flexible pipe from a substantially circular cross-sectional shape to a more oval shape. A flexible pipe with an oval cross-sectional shape can lead to kinking of the flexible pipe during deployment. The rerounder systems described below enable the changing of the cross-sectional shape of the flexible pipe (e.g., rerounding the flexible pipe).

FIG. 1A illustrates a perspective view of a pipe deployment system 10. The pipe deployment system 10 may include a vehicle 12 that carries pipe 14 (e.g., spoolable pipe) to various job sites. The pipe 14 may be any type of flexible pipe or piping capable of being bent into a coil. The pipe 14 may be wound on a spool or reel 16, or the pipe 14 may be handled as coils without spools or reels. These reels or coils of pipe 14 may reduce the amount of space taken up by the pipe during manufacturing, shipping, transportation, and deployment compared to rigid pipe that is not capable of being rolled (e.g., bent) into a coil.

Pipe is a tube to convey or transfer any water, gas, oil, or any type of suitable fluid. The pipe 14 may be made of any type of materials including plastics, metals, composites (e.g., fiber-reinforced composites), and/or other suitable materials. The pipe 14 is used frequently in many applications, including without limitation, both onshore and offshore oil and gas applications. The pipe 14 may be a flexible pipe, which may include Bonded or Unbonded Flexible Pipe, Flexible Composite Pipe (FCP), Thermoplastic Composite Pipe (TCP) or Reinforced Thermoplastic Pipe (RTP). FCP or RTP pipe may itself be generally composed of several layers. In one or more embodiments, a flexible pipe may include a high-density polyethylene (HDPE) pipe having a reinforcement layer and an HDPE outer cover layer. Thus, flexible pipe may include different layers that may be made of a variety of materials and may also be treated for corrosion resistance. For example, in one or more embodiments, pipe used to make up a coil of pipe may have a corrosion protection shield layer that is disposed over another layer of steel reinforcement. In this steel-reinforced layer, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed and re-usability. Another type of flexible or spoolable pipe is coiled tubing, which may be made of steel and have corrosion protection shield layer.

The vehicle 12 may include a bed 18 that supports the reel 16 and pipe 14. For example, the bed 18 may support a base or skid 20 (e.g., reel skid) of the reel 16. The bed 18 may also support other components that facilitate installation of the pipe 14. For example, the bed 18 may support a lifting mechanism(s) that lifts the reel 16, a hydraulic power system(s) 22, and a rerounder system 24, among others. The hydraulic power system 22 may be coupled to the vehicle 12 or may be disposed on a separate skid that is loaded onto the bed 18. In operation, the hydraulic power system 22 provides hydraulic power to a variety of systems on the vehicle 12. For example, the hydraulic power system 22 may provide power for rotating the reel 16 as well as providing power to one or more hydraulic actuators on the rerounder system 24.

In operation, the pipe 14 is fed through the rerounder system 24. As the pipe 14 passes through the rerounder system 24, the cross-sectional shape of the pipe 14 is changed to reduce kinking of the pipe 14 during deployment. For example, during the pipe winding process, the winding of the pipe 14 onto the reel 16 may bend the pipe 14 changing its cross-sectional shape from a substantially circular cross-section to a non-circular cross-section (e.g., an oval or oval-like cross-section). Unfortunately, a non-circular cross-section may enable the pipe 14 to more easily kink. Accordingly, by reshaping the pipe 14, the rerounder system 24 may reduce and/or block kinking of the pipe 14.

In order to reduce and/or block pipe slack between the reel 16 and the rerounder system 24, the rerounder system 24 may be mounted on the vehicle 12 (e.g., coupled to the bed 18). It should be understood, that the term vehicle 12 may include a motorized vehicle and/or trailer. Mounting the rerounder system 24 on the vehicle 12 reduces or minimizes the distance between the reel 16 and the rerounder system 24. The shorter the distance, the less likely slack will develop in the pipe 14 and, therefore, the less likely the pipe 14 is to kink as the pipe 14 unwinds while being reshaped. In some embodiments, the rerounder system 24 may be mounted to the reel skid 20 or a trailer that supports the reel skid 20 in order to place the rerounder system 24 proximate the unwinding pipe 14. In some embodiments, the rerounder system 24 may not couple to a trailer or vehicle.

The rerounder system 24 includes a mounting frame 26. The mounting frame 26 includes a first frame end 28, a second frame end 30, and a bar 32 that extends between the first frame end 28 and the second frame end 30. The bar 32 supports a rerounder 34 that slides back and forth in directions 36 and 38 between the first frame end 28 and the second frame end 30. The ability of the rerounder 34 to slide back and forth on the bar 32 reduces and/or blocks bending of the pipe 14 as it unwinds from the reel 16. That is, the rerounder 34 moves in directions 36 and 38 in response to the changing position of the pipe 14 as the unwinding portion of the pipe 14 changes position along the axis 40 of the reel 16. In this way, the rerounder system 24 may minimize bending of the pipe 14 in directions 36 and 38 as the pipe 14 unwinds from the reel 16.

The first frame end 28 and the second frame end 30 of the mounting frame 26 couple to the vehicle 12. For example, the first frame end 28 and the second frame end 30 may couple to respective first and second portions 42 and 44 of a vehicle frame 46. As illustrated, the first frame end 28 forms a hinged coupling or connection 48 that enables the rerounder system 24 to rotate relative to the vehicle 12. The second frame end 30 couples to the vehicle frame 42 with a fastener system 50 (e.g., a latch). In this way, the second frame end 30 may be uncoupled from the vehicle 12 enabling the rerounder system 24 to rotate in direction 52, or in other words swing open (seen in FIG. 2). The ability of the rerounder system 24 to rotate relative to the vehicle 12 may enable loading and unloading of various equipment from the vehicle 12. For example, an exhausted reel 16 (i.e., reel 16 with little or no pipe 14) and its associated skid 20 may be removed and replaced with a full reel 16 (i.e., a reel 16 with pipe 14).

It should be understood that the rerounder 34 may be oriented in different ways to accommodate unspooling pipe. For example, the rerounder 34 coupled to the vehicle 12 is illustrated with the opening substantially horizontal relative to the ground. A rerounder may also be substantially vertical relative to the ground, as illustrated by a rerounder 60 in FIG. 1B. It should be understood that other orientations of the rerounder 34 are possible as well.

Figure 2:
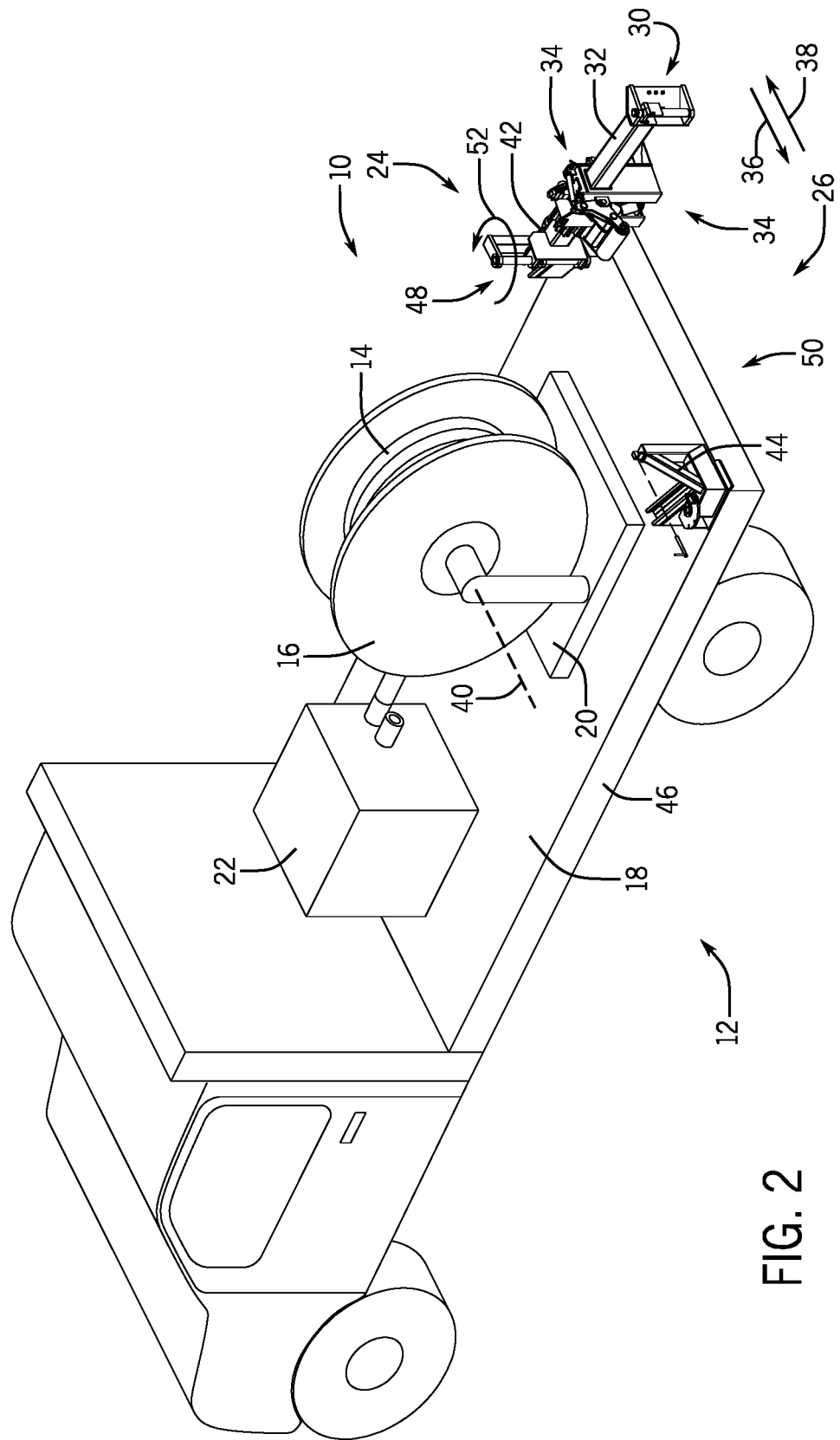
FIG. 2 is a perspective view of a pipe deployment system with a rerounder system, according to embodiments of the present disclosure.
Figure 3:
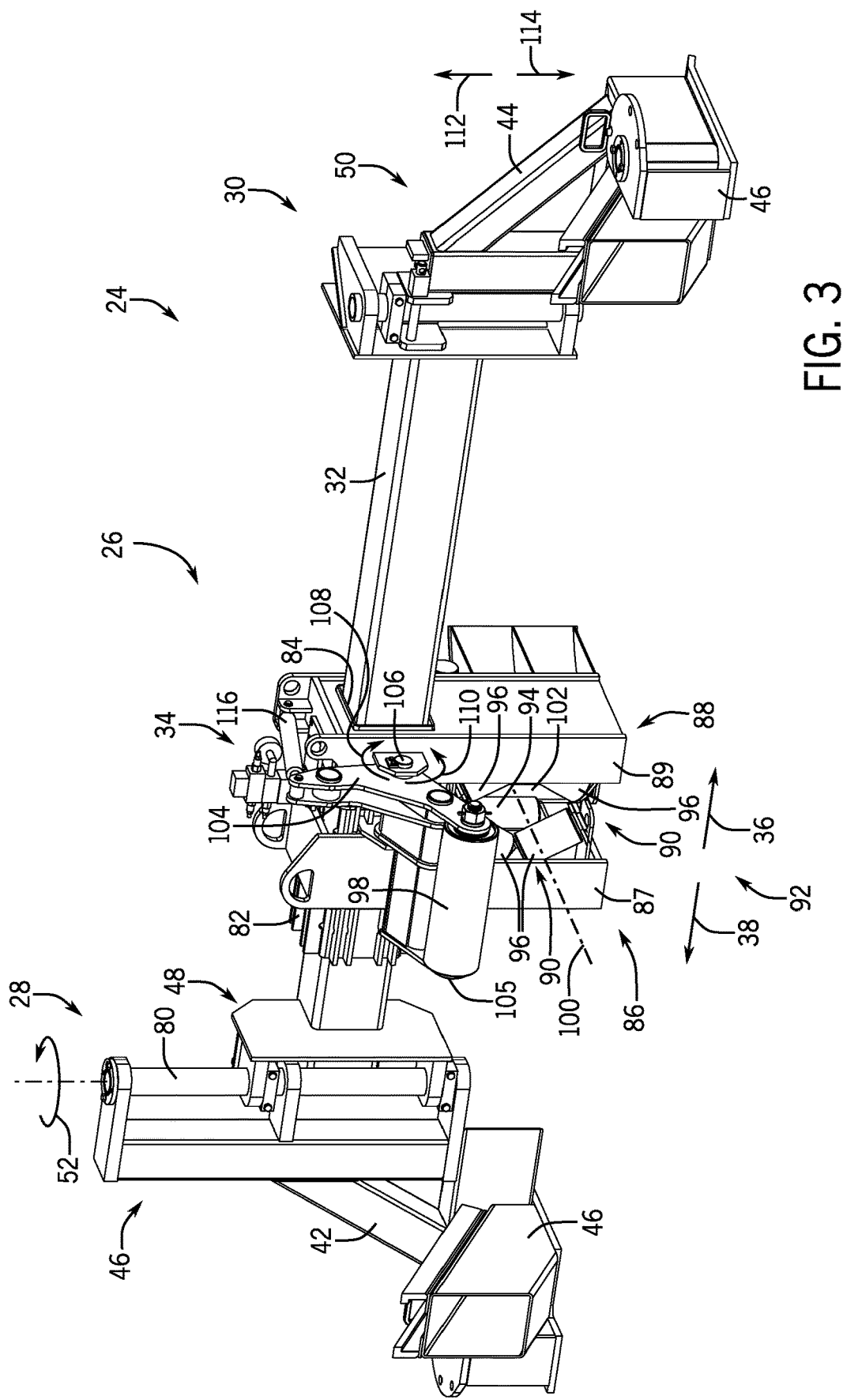
FIG. 3 is a perspective rear view of a rerounder system, according to embodiments of the present disclosure.

FIG. 3 is a perspective rear view of the rerounder system 24 in FIGS. 1 and 2. As explained above, the rerounder system 24 includes the mounting frame 26. The mounting frame 26 includes the first frame end 28 and the second frame end 30 and the bar 32 that extends between the first frame end 28 and the second frame end 30. The bar 32 supports the rerounder 34, which slides back and forth in directions 36 and 38 between the first frame end 28 and the second frame end 30. The ability of the rerounder 34 to slide back and forth on the bar 32 reduces and/or blocks bending of the pipe 14 as it unwinds from the reel 16 (seen in FIGS. 1 and 2).

The first frame end 28 and the second frame end 30 of the mounting frame 26 are configured to couple to the vehicle frame 46. It should be understood that the mounting frame may couple to another structure, such as the reel skid 20 or to a trailer. The first frame end 28 and the second frame end 30 couple to respective first and second portions 42 and 44 of the vehicle frame 46. As illustrated, the first frame end 28 forms a hinged coupling or connection 48 that enables the rerounder system 24 to rotate about a shaft 80. The second frame end 30 couples to the vehicle frame 42 as well but with the fastener system 50 (e.g., a latch). The second frame end 30 may therefore be uncoupled from the vehicle 12 enabling the rerounder system 24 to rotate in direction 52, or in other words swing open (seen in FIG. 2). The ability of the rerounder system 24 to rotate relative to the vehicle 12 may enable loading and unloading of various equipment from the vehicle 12, such as reel 16 and its skid 20.

As explained above, the rerounder system 24 includes the rerounder 34, which changes the cross-sectional shape of the pipe 14. The rerounder 34 includes a housing 82 that defines an aperture 84. The aperture 84 enables the housing 82 to slide over the bar 32 as the position of the pipe 14 changes while unwinding from the reel 16. Coupled to the housing 82 are first and second clamp arm assemblies 86, 88 that include first and second clamp arm housings 87, 89. The first and second clamp arm assemblies 86, 88 define a gap 90 that receives the pipe 14. As will be explained below, the first clamp arm assembly 86 moves relative to the second clamp arm assembly 88 in order increase and decrease the gap 90. Increasing and decreasing the gap 90 enables the rerounder 34 to receive the pipe 14 as well as accommodate differently sized pipes (e.g., pipes with different diameters).

As illustrated, the rerounder 34 includes rollers 92. The rollers 92 both capture and reshape the pipe 14 as it passes through the rerounder 34. For example, the rerounder 34 may include a first set of rollers 94, a second set of rollers 96, and a third set of rollers 98. The first set of rollers 94 are configured to reshape the pipe 14 by compressing the pipe 14. In other words, the first set of rollers 94 change a cross-sectional shape of the pipe 14 from a cross-sectional shape that is not round (e.g., oval) to a substantially round cross-section. The first set of rollers 94 may include two or more rollers that are opposed to each other and that are offset from the second set of rollers 96 along a longitudinal axis 100 of the gap 90 that extends between the first and second clamp arm assemblies 86, 88.

The second set of rollers 96 are configured to capture and retain the pipe 14 within the rounder 34 as well as block overshaping of the pipe 14 by the first set of rollers 94. For example, the second set of rollers 96 may block the first set of rollers 94 from forming an oval cross-sectional shape in the pipe 14 in a different orientation relative to an oval shape of the pipe 14 before it entered the rerounder 34. The second set of rollers 96 may include four or more rollers that define an aperture 102 that receives the pipe 14. In FIG. 3, the second set of rollers 96 includes four rollers, but it should be understood that the second set of rollers 96 may include a different number of rollers (e.g., 1, 2, 4, 6, 8, or more). As illustrated, the second set of rollers 96 are angled relative to each other to form the aperture 102 when the first and second clamp arm assemblies 86, 88 are in a closed position.

The third set of rollers 98 may include one or more rollers that couple to a roller arm 104 with a shaft or pin 105. The roller arm 104 couples to a pivot point 106 enabling the roller arm 104 to rotate in directions 108 and 110. As the roller arm 104 rotates, the roller arm 104 lifts and lowers the third set of rollers 98 in directions 112 and 114. The third set of rollers 98 is configured to block contact between the pipe 14 and the housing 82 and/or other portions of the rerounder 34. For example, the pipe 14 may be fed into the rerounder 34 at an angle which would result in contact with the housing 82. The third set of rollers 98 blocks this contact by driving the pipe 14 in direction 114 as the pipe 14 enters the gap 90. The roller arm 104 is driven by an actuator 116 (e.g., hydraulic actuator, electric actuator, pneumatic actuator). The actuator 116 couples to the housing 82 and to the roller arm 104. In operation, the contraction or extension of the actuator 116 drives rotation of the roller arm 104 about the pivot point 106 in directions 108 and 110. In some embodiments, the rerounder 34 may not include the third set of rollers 98. Instead, the roller arm 104 may define a curved surface configured to contact the pipe 14. In operation, the pipe 14 is configured to slide against the curved surface as the pipe 14 is driven in direction 114.

Figure 4:
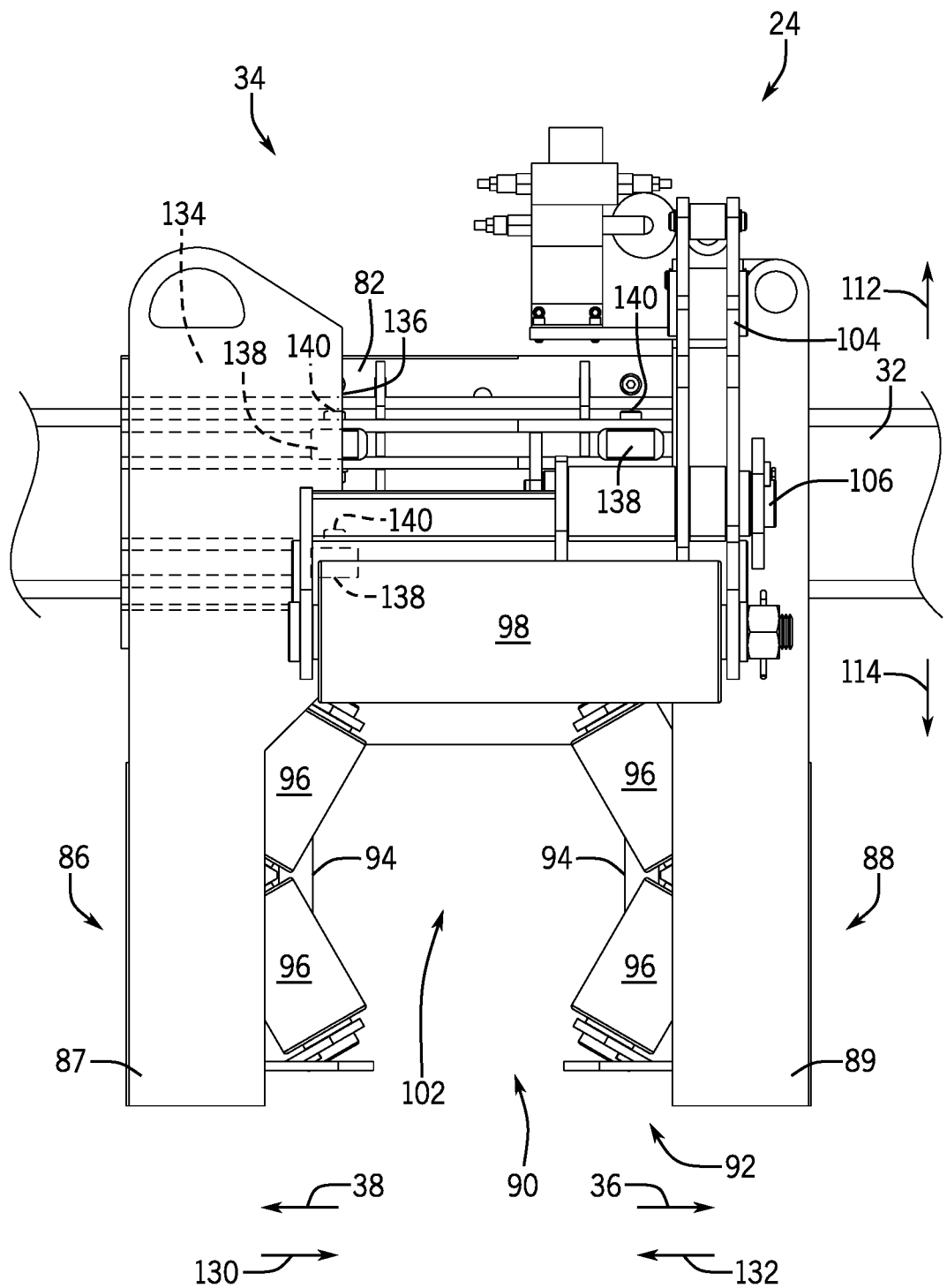
FIG. 4 is a rear view of a rerounder system, according to embodiments of the present disclosure.

FIG. 4 is a rear view of the rerounder system 24. As illustrated, the rerounder 34 is in an open position. In the open position, pipe 14 can be placed within the gap 90 (e.g., lifted, raised). Once the pipe 14 is within the gap 90, the first and/or second clamp arm assemblies 86, 88 may be driven inward in directions 130, 132 into a closed position to capture the pipe 14. In the closed position, the pipe 14 contacts and rests on the second set of rollers 96, which blocks removal of the pipe 14 in direction 114.

It should be understood that various configurations of the rerounder 34 may enable the opening and closing of the gap 90. For example, the first clamp arm assembly 86 may move relative to the second clamp arm assembly 88 to open and close the rerounder 34. The first clamp arm assembly 86 is able to move relative to the second clamp arm assembly 88 by sliding over a portion 134 of the housing 82. For example, the first clamp arm assembly 86 may define an aperture 136 that receives the portion 134 of the housing 82. In operation, the first clamp arm assembly 86 slides back and forth in directions 36 and 38 over the portion 134 as the rerounder 34 opens and closes. In some embodiments, both the first and second clamp arm assemblies 86, 88 may move relative to each other to open and close the rerounder 34. And in still other embodiments, the second clamp arm assembly 88 may move relative to the first clamp arm assembly 86 to open and close the rerounder 34.

To facilitate movement of the housing 82 relative to the bar 32, the rerounder 34 may include one or more rollers 138. The rollers 138 may couple to the housing 82 with pins 140. In operation, the rollers 138 rotate about the pins 140 to facilitate movement (e.g., sliding) of the housing 82 over the bar 32 and/or of the second clamp arm assembly 88 over the housing 82 (e.g., aperture 136).

Figure 5:
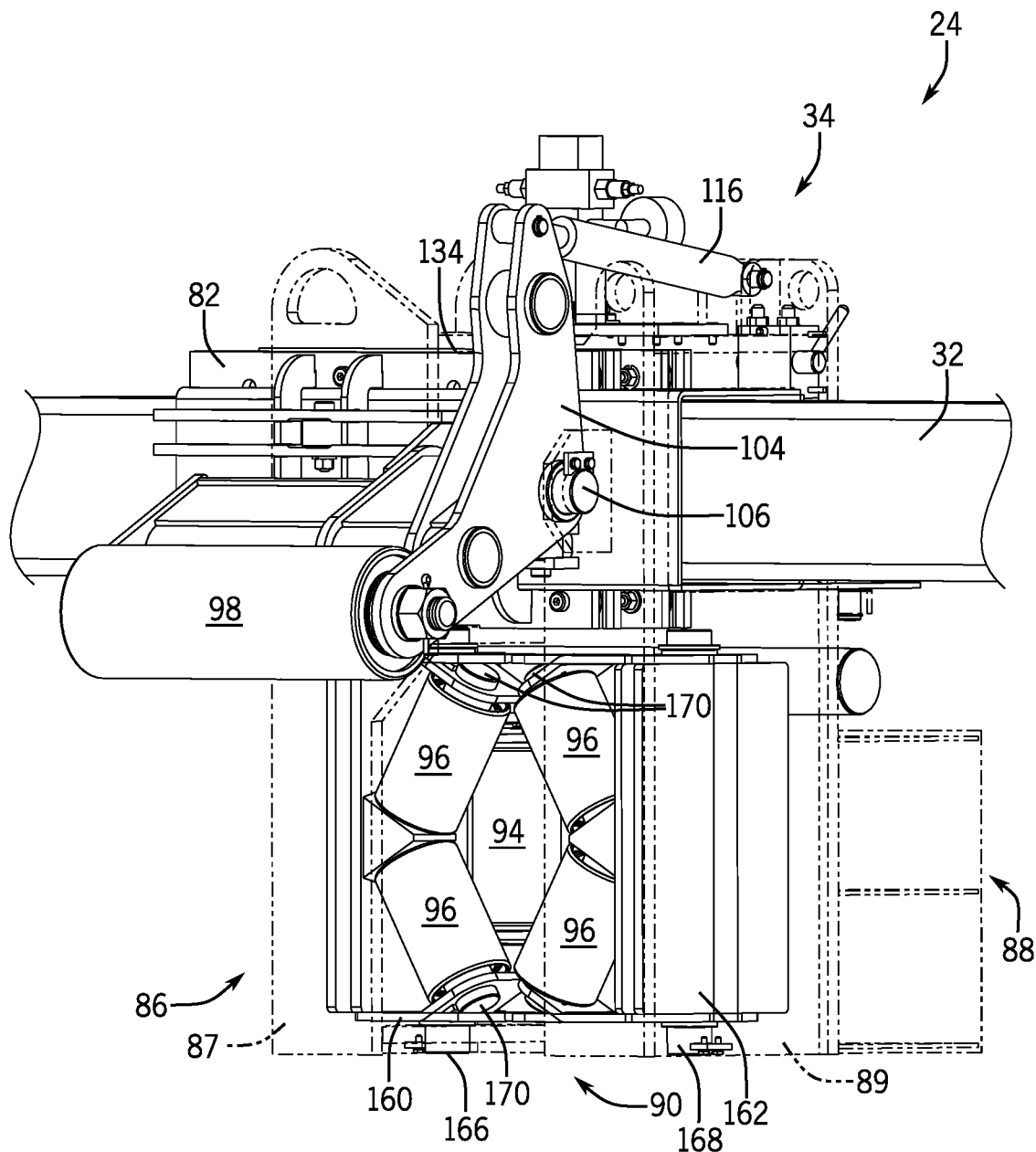
FIG. 5 is a perspective rear view of a rerounder system, according to embodiments of the present disclosure.

FIG. 5 is a perspective rear view of the rerounder system 24. As illustrated, the first and second clamp arm assemblies 86, 88 are dashed to illustrate a first roller carrier 160 and a second roller carrier 162. The first roller carrier 160 couples to and is supported by the first clamp arm housing 87 and the second roller carrier 162 couples to and is support by the second clamp arm housing 89. The first and second roller carriers 160 and 162 couple to the respective first and second clamp arm housings 87, 89 with respective first and second shafts 166 and 168. In operation, the shafts 166 and 168 form a pivot connection that enables the first and second roller carriers 160, 162 to rotate within the respective first and second clamp arm housings 87, 89. The ability of the first and second roller carriers 160, 162 to rotate within the first and second clamp arm housings 87, 89 may reduce bending forces on the pipe 14 as it feeds into and through the rerounder 34. In other words, the ability of the first and second roller carriers 160, 162 to rotate may reduce and/or block kinking of the pipe 14 as it moves through the rerounder 34.

As illustrated, the first and second roller carriers 160, 162 couple to and support rollers from both the first set of rollers 94 and the second set of rollers 96. For example, both the first roller carrier 160 and the second roller carrier 162 respectively support a single roller from the first set of rollers 94 and two rollers from the second set of rollers 96. The first set of rollers 94 and the second set of rollers 96 couple to the first and second roller carriers 160, 162 with shafts 170. The shafts 170 enable the first set of rollers 94 and the second set of rollers 96 to rotate relative to each other and to the first and second rollers carriers 160, 162 to facilitate the movement of the pipe 14 through the rerounder 34.

Figure 6:
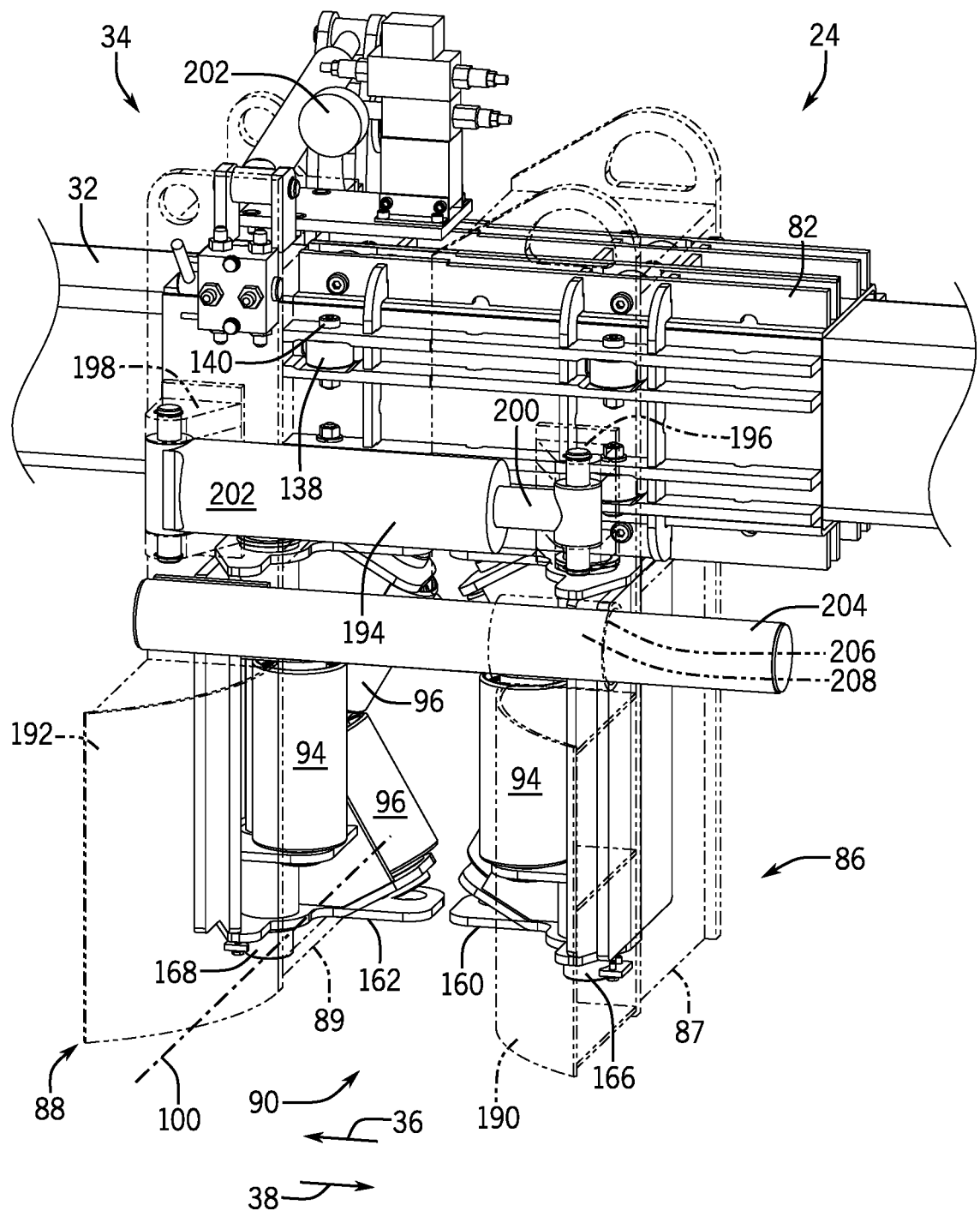
FIG. 6 is a perspective front view of a rerounder system, according to embodiments of the present disclosure.

FIG. 6 is a perspective front view of the rerounder system 24. The pipe 14 exits the rerounder 34 after contacting the first set of rollers 94. As explained above, the first set of rollers 94 changes the cross-sectional shape of the pipe 14 to reduce and/or block pipe kinking. For example, the rerounder 34 may change the cross-sectional shape of the pipe 14 from an oval or oval-like cross-section to a substantially round cross-section. In some embodiments, the rerounder 34 may also reduce bending of the pipe 14 as it exits the rerounder 34. For example, the first and second clamp arm housings 87, 89 may include respective curvilinear surfaces 190, 192. The curvilinear surfaces 190, 192 are configured to reduce bending forces on the pipe 14 in situations where the pipe 14 is laid at an angle relative to a longitudinal axis 100 of the gap 90 extending through the first and second clamp arm assemblies 86, 88. For example, the rerounder system 24 may not be aligned with a trench that receives the pipe 14. Accordingly, the portion of the pipe 14 that is in the trench may cause a portion of the pipe 14 exiting the rerounder 34 to bend relative to the rerounder 34.

As explained above, the first clamp arm assembly 86 may move relative to the second clamp arm assembly 88 to increase and decrease the size of the gap 90. Movement of the first clamp arm assembly 86 is driven by an actuator 194. The actuator 194 couples to the first clamp arm assembly 86 and the second clamp arm assembly 88 at respective connection points 196, 198. The actuator 194 may be a hydraulic actuator, electrical actuator, or a combination thereof. In FIG. 6, the illustrated actuator 194 is a double acting hydraulic piston cylinder actuator. In operation, hydraulic fluid drives a piston 200 in direction 38 out of a cylinder 202 to expand the gap 90. Similarly, hydraulic fluid drives the piston 200 in direction 36 into the cylinder 202 to retract the piston 200 and close the gap 90.

In some embodiments, the rerounder 34 may include a shaft 204 coupled to the first clamp arm assembly 86 that extends through an aperture 206 on the first clamp assembly 86. For example, the first clamp arm assembly 86 may include a tube or conduit 208 that receives the shaft 204. The shaft 204 slides in and out aperture 206 as the gap 90 increases and decreases between the first and second clamp arm assemblies 86, 88. The shaft 204 is configured to reduce or block rotation of the first clamp arm assembly 86 relative to the second clamp arm assembly 88 to reduce torsion of the piston 200 during operation of the rerounder system 24.

Figure 7:
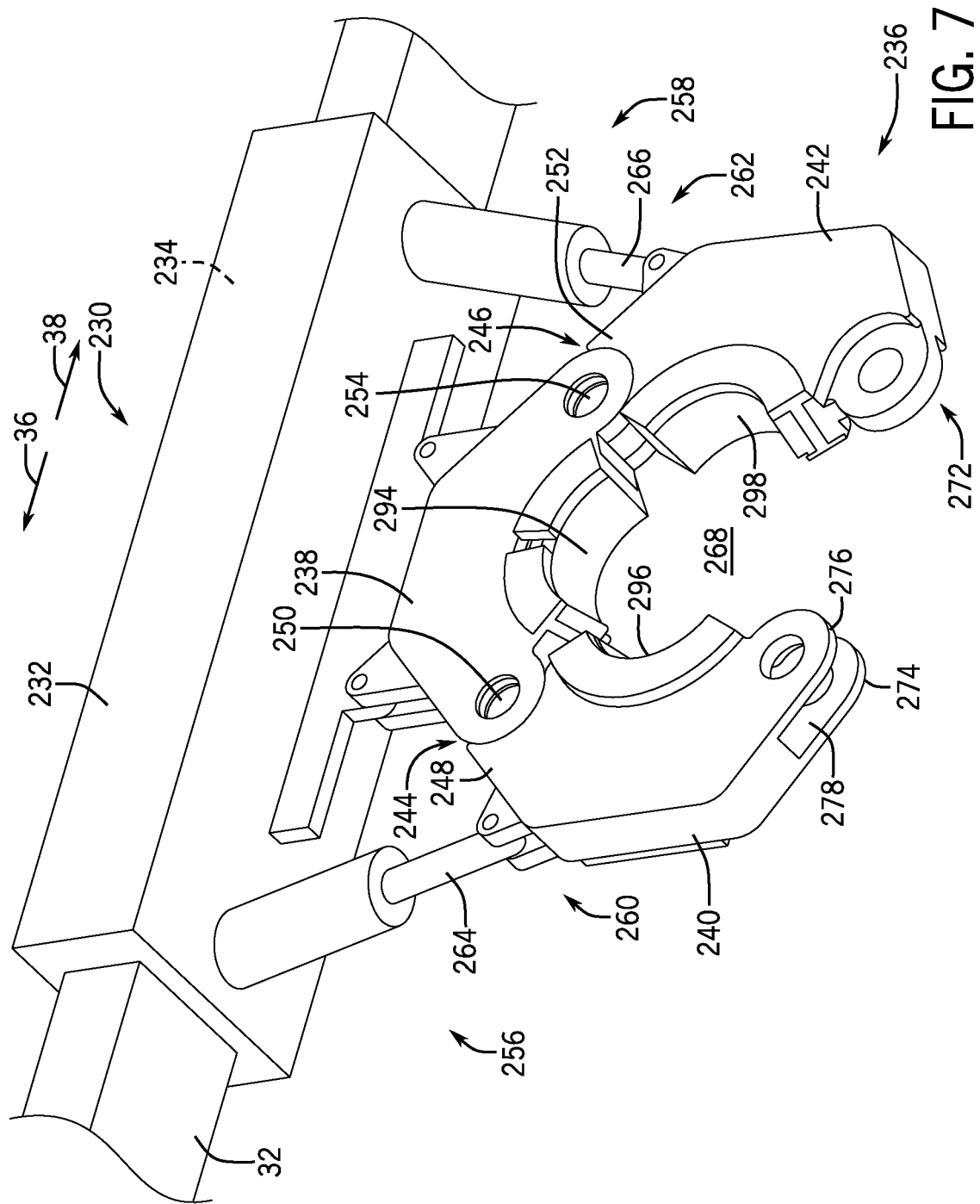
FIG. 7 is a perspective view of a rerounder system in an open position, according to embodiments of the present disclosure.

FIG. 7 is a perspective view of a rerounder 230, which may be used in addition to or as an alternative to the rerounder 34. As explained above, the winding of the pipe 14 onto the reel 16 may change the cross-sectional shape of the pipe 14. For example, during the pipe winding process, the winding of the pipe 14 onto the reel 16 may bend the pipe 14 changing its cross-sectional shape from a substantially circular cross-section to a non-circular cross-section (e.g., an oval or oval-like cross-section). A non-round cross-sectional shape may enable the pipe 14 to more easily kink. Accordingly, as the pipe 14 is unwound from the reel 16, the pipe 14 may be directed through the rerounder 230. As the pipe 14 passes through the rerounder 230, the cross-sectional shape of the pipe 14 is changed to reduce kinking of the pipe 14 during deployment.

The rerounder 230 includes a housing 232. The housing 232 defines an aperture 234 that receives the bar 32 (seen in FIGS. 1 and 2). The bar 32 supports the rerounder 230 as the rerounder 230 slides back and forth in directions 36 and 38. The ability of the rerounder 230 to slide back and forth on the bar 32 reduces and/or blocks bending of the pipe 14 as it unwinds from the reel 16. In some embodiments, the rerounder 230 may also swivel and/or rotate on a bar (e.g., circular bar) to facilitate the passage of pipe 14 through the rerounder 230.

In order to change the cross-sectional shape of the pipe 14 (e.g., round the pipe 14), the rerounder 230 includes two or more die sections 236. The die sections 236 clamp around the pipe 14 and reshape the pipe 14 as it passes through. As illustrated, the rerounder 230 includes a first die section 238, a second die section 240, and a third die section 242. The first die section 238 couples to the housing 232 and defines a first end 244 and a second end 246. It is to these first and second ends 244, 246 that couple to the second die section 240 and the third die section 242. More specifically, a first end 248 of the second die section 240 forms a pivoting connection 250 with the first end of the first die section 238, and a first end 252 of the third die section forms a pivoting connection 254 with the second end 246 of the first die section 238. The pivoting connections 250 and 254 enable the second and third die sections 240, 242 to rotate relative to the first die section 238 to form a die aperture that receives the pipe 14.

The second and third die sections 240 and 242 rotate in response first and second actuators 256 and 258. The first and second actuators 256, 258 couple to the housing 232 and to the respective second die section 240 and the third die section 242. More specifically, the first actuator 256 couples to the second die section 240 with a pivoting connection 260, and the second actuator 258 couples to the third die section 242 with a pivoting connection 262. The first and second actuators 256, 258 may be hydraulic, pneumatic, electrical actuators or a combination thereof. For example, the first and second actuators 256, 258 may be double acting hydraulic piston cylinder actuators that use hydraulic fluid to respectively extend and retract pistons 264, 266.

In operation, the pipe 14 may be placed within the gap 268 defined by the first, second, and third die sections 238, 240, and 242. Once within the gap 268, the actuators 256 and 258 may be engaged. As the pistons 264 and 266 extend, they drive the second and third die sections 240 and 242 to rotate about the pivot connections 250 and 254. The second and third die sections 240 and 242 continue to rotate until their respective second ends 270 and 272 couple together (seen in FIG. 8). In some embodiments, the second end 270 of the second die section 240 may define two flanges 274 and 276 that define a gap 278. The gap 278 is configured to receive the second end 272 of the third die section 242.

Figure 8:
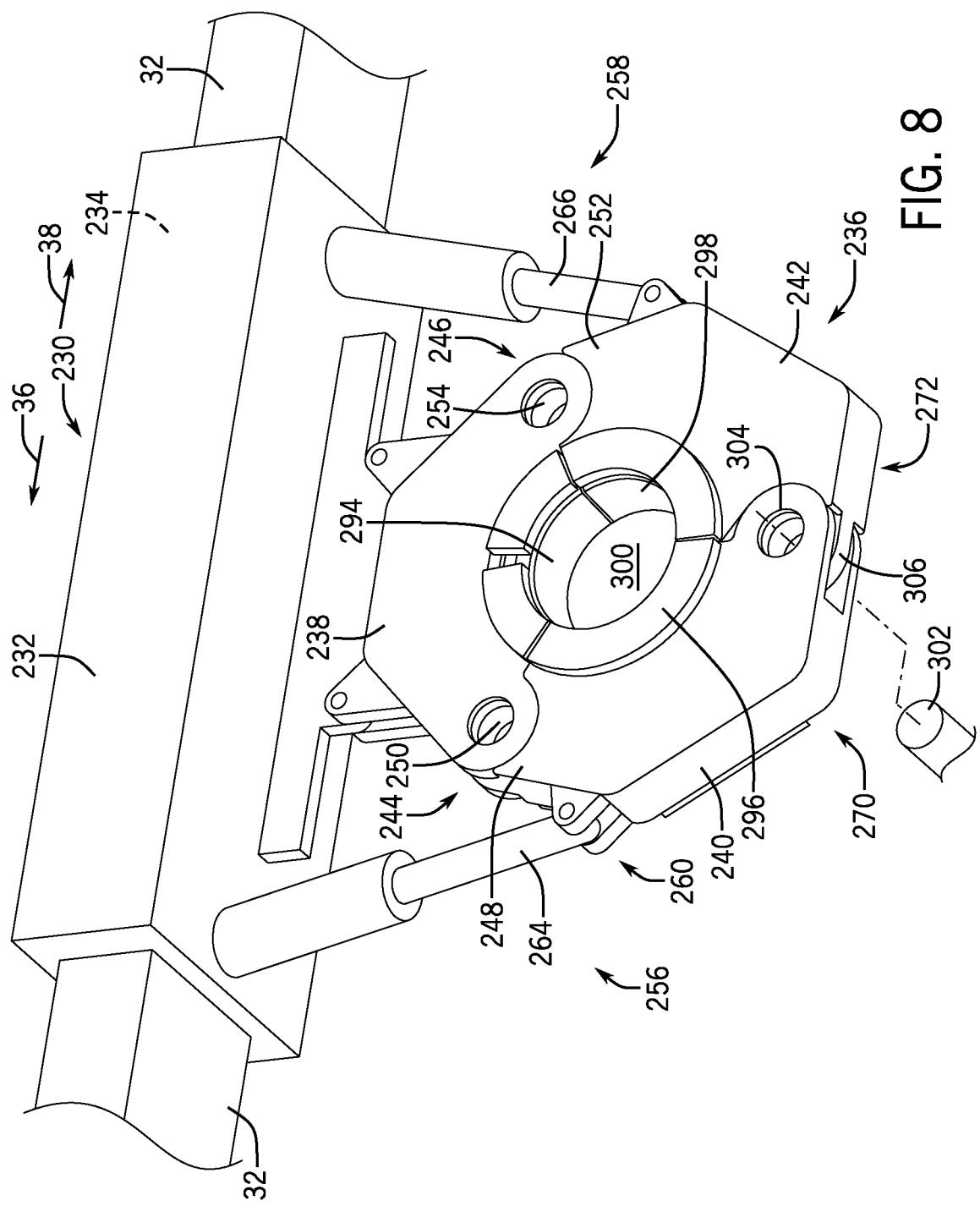
FIG. 8 is a perspective view of a rerounder system in a closed position, according to embodiments of the present disclosure.

FIG. 8 is a perspective view of the rerounder 230 in a closed position. In the closed position, the first, second, and third die sections 238, 240, and 242 contact and compress the pipe 14 changing the cross-sectional shape of the pipe 14. More specifically, die plates 294, 296, and 298 that couple to the respective first, second, and third die sections 238, 240, and 242 contact the pipe 14. As the pipe 14 is then driven through the die aperture 300, the die plates 294, 296, and 298 may continuously change portions of the pipe 14 that have a cross-sectional shape that differs from the die aperture 300. In some embodiments, the closed position of the rerounder 230 may be maintained with a pin 302 placed within apertures 304 and 306 in the second ends 270 and 272 of the second and third die sections 240, 242. The pin 302 is configured to block rotation of the second and third die sections 240, 242 and thus opening of the rerounder 230 during operation. It should be understood, that the instead of the pin 302 the actuators 256 and 258 may maintain the rerounder 230 in a closed position. In some embodiments, an automatic lubricant applicator may couple to the rerounder 230. In operation, the automatic lubricant applicator may release lubricant to facilitate movement of the pipe 14 (e.g., reduce friction) as the pipe 14 is reshaped in the rerounder 230.

Technical effects of the invention include a rerounder system that changes the cross-sectional shape of pipe to reduce or block pipe kinking. The rerounder system couples to a trailer, vehicle, or reel skid to reduce pipe slack between the reel and a rerounder of the rerounder system. Another effect of the rerounder system is the ability to reduce pipe bending by enabling the rerounder to move axially along a shaft or bar as the position of the unwinding pipe changes on a reel.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A pipe deployment system, comprising:
   a pipe deployment vehicle, wherein the pipe deployment vehicle comprises a vehicle frame;
   a coil of pipe configured to be loaded on the vehicle frame of the pipe deployment vehicle; and
   a rerounder system coupled to the vehicle frame of the pipe deployment vehicle, wherein the rerounder system is configured to transition between a closed position and an open position that enables the pipe to be raised into the rerounder system and comprises:
     a set of vertical rollers configured to compress an outer surface of the pipe as the pipe is uncoiled from the coil of pipe to facilitate changing a cross-sectional shape of the pipe while the rerounder system is in the closed position;
     a horizontal roller positioned upstream of the set of vertical rollers, wherein the rerounder system is configured to cause the pipe to pass under the horizontal roller to facilitate guiding the pipe into a gap between the set of vertical rollers; and
     a set of slanted rollers positioned between the set of vertical rollers and the horizontal roller, wherein each roller in the set of slanted rollers is slanted relative to the set of vertical rollers and the horizontal roller and the set of slanted rollers is configured to block the pipe from falling out of the gap between the set of vertical rollers while the rerounder system is in the closed position.

2. The pipe deployment system of claim 1, wherein the rerounder system comprises:
   a bar, wherein a first end of the bar is configured to be coupled to the vehicle frame of the pipe deployment vehicle via a fastener system and a second end of the bar is pivotably connected to the vehicle frame to enable the rerounder system to rotate relative to the vehicle frame to facilitate loading the coil of pipe onto the pipe deployment vehicle; and
   a housing slidably connected to the bar, wherein the housing is configured to slide along the bar in response to uncoiling of the pipe from the coil of pipe.

3. The pipe deployment system of claim 1, wherein the rerounder system comprises:
   a first clamp arm assembly, wherein the first clamp arm assembly comprises a first roller of the set of vertical rollers, a second roller of the set of slanted rollers, and a third roller of the set of slanted rollers; and
   a second clamp arm assembly, wherein the second clamp arm assembly comprises a fourth roller of the set of vertical rollers, a fifth roller of the set of slanted rollers, and a sixth roller of the set of slanted rollers and the first clamp arm assembly is configured to move relative to the second clamp arm assembly to facilitate adjusting size of the gap between the set of vertical rollers.

4. The pipe deployment system of claim 1, wherein the set of vertical rollers and the set of slanted rollers are offset from each other along an axis of the gap between the set of vertical rollers.

5. The pipe deployment system of claim 1, wherein the set of slanted rollers comprises:
   a first roller;
   a second roller;
   a third roller; and
   a fourth roller.

6. The pipe deployment system of claim 5, wherein each roller in the set of slanted rollers is co-planar with each other roller in the set of slanted rollers.

7. The pipe deployment system of claim 1, wherein the rerounder system comprises:
- a housing;
- a roller arm pivotably connected to the housing, wherein the horizontal roller is coupled to the roller arm via a shaft; and
- an actuator connected between the housing and the roller arm.

8. The pipe deployment system of claim 7, wherein the actuator is configured to:
- extend to lower the horizontal roller; and
- retract to raise the horizontal roller.

9. The pipe deployment system of claim 7, wherein the horizontal roller is configured to block the pipe from contacting the housing of the rerounder system.

* * * * *